United States Patent
Rogers et al.

(10) Patent No.: US 11,960,444 B2
(45) Date of Patent: Apr. 16, 2024

(54) METHODS AND SYSTEMS FOR PROVIDING FILE DATA FOR A MEDIA FILE

(71) Applicant: GRASS VALLEY LIMITED, Newbury (GB)

(72) Inventors: Simon Darryl Rogers, Newbury (GB); James Westland Cain, Newbury (GB); Michael James Weaver, Newbury (GB)

(73) Assignee: GRASS VALLEY LIMITED, Newbury (GB)

(*) Notice: Subject to any disclaimer, the term of this patent is extended or adjusted under 35 U.S.C. 154(b) by 410 days.

(21) Appl. No.: 16/991,991

(22) Filed: Aug. 12, 2020

(65) Prior Publication Data
US 2020/0371994 A1    Nov. 26, 2020

Related U.S. Application Data

(63) Continuation of application No. 14/375,713, filed as application No. PCT/GB2013/050157 on Jan. 24, 2013, now Pat. No. 10,747,722.

(30) Foreign Application Priority Data

Feb. 3, 2012   (GB) ................................. 1201994

(51) Int. Cl.
*G06F 16/00*   (2019.01)
*G06F 16/16*   (2019.01)
(Continued)

(52) U.S. Cl.
CPC .............. *G06F 16/16* (2019.01); *G06F 16/51* (2019.01); *G11B 27/031* (2013.01);
(Continued)

(58) Field of Classification Search
CPC ....... G06F 16/16; G06F 16/51; G11B 27/031; G11B 27/105; G11B 27/3027;
(Continued)

(56) References Cited

U.S. PATENT DOCUMENTS 7,337,231 B1 *   2/2008   Li .................... H04N 21/23805
                                                            709/231
2005/0025460 A1   2/2005   Hyodo et al.
(Continued)

FOREIGN PATENT DOCUMENTS

EP          1713284 A1     10/2006
WO        2010025686 A1     3/2010

OTHER PUBLICATIONS

Ferreira, "MXF—A Technical Overview", EBU Technical Review—2010 Q3, Sep. 1, 2010, pp. 1-10, Publisher: European Broadcasting Union, Published in: Geneva, Switzerland, retrieved Jan. 22, 18 from https://tech.ebu.ch/docs/techreview/trev_2010-Q3_MXF-2.pdf.

*Primary Examiner* — Paul Kim
(74) *Attorney, Agent, or Firm* — ARENTFOX SCHIFF LLP

(57) ABSTRACT

A method of providing file data for a media file of a pre-determined format from a file system comprising a file record database and a data store, wherein the media file corresponds to a programme consisting of a plurality of segments, and wherein the segments included in the programme are dynamically determined. The method comprising the steps of receiving details of the programme including the duration of the programme, and determining the layout of the media file in the pre-determined format from the received details of the programme, the layout including locations for essence data within the file. A file record for the media file in the file record database is then created. In response to a request for the location of essence data within
(Continued)

the file, a location given by determined layout of the media file is returned. Further, in response to an instruction that a segment is to be included in the programme, essence data corresponding to the contents of the segment is obtained. Then, in response to a request for a portion of essence data from the media file corresponding to a time period of the programme, essence data derived from the received essence data according to the determined layout of the media file is returned.

17 Claims, 8 Drawing Sheets

(51) Int. Cl.
*G06F 16/51* (2019.01)
*G11B 27/031* (2006.01)
*G11B 27/10* (2006.01)
*G11B 27/30* (2006.01)
*H04N 21/2343* (2011.01)
*H04N 21/61* (2011.01)
*H04N 21/845* (2011.01)
*H04N 21/854* (2011.01)

(52) U.S. Cl.
CPC ........ *G11B 27/105* (2013.01); *G11B 27/3027* (2013.01); *H04N 21/234309* (2013.01); *H04N 21/6125* (2013.01); *H04N 21/8456* (2013.01); *H04N 21/85406* (2013.01)

(58) Field of Classification Search
CPC ....... H04N 21/234309; H04N 21/6125; H04N 21/8456; H04N 21/85406; H04N 21/8543
See application file for complete search history.

(56) References Cited

U.S. PATENT DOCUMENTS

| | | |
|---|---|---|
| 2006/0233534 A1 | 10/2006 | Haupt et al. |
| 2007/0206676 A1 | 9/2007 | Yamazaki |
| 2008/0263608 A1 | 10/2008 | White |
| 2010/0115575 A1 | 5/2010 | Yu et al. |
| 2011/0030031 A1 | 2/2011 | Lussier et al. |
| 2011/0119394 A1* | 5/2011 | Wang ............... H04L 65/65 709/231 |
| 2013/0287361 A1 | 10/2013 | Teixeira |
| 2014/0379765 A1 | 12/2014 | Rogers et al. |

* cited by examiner

METHODS AND SYSTEMS FOR PROVIDING FILE DATA FOR A MEDIA FILE

CROSS-REFERENCE TO RELATED APPLICATIONS

This application is a continuation of U.S. application Ser. No. 14/375,713, filed Jul. 30, 2014, which is a National Stage Entry of PCT Application No.: PCT/GB2013/050157, filed Jan. 24, 2013, which claims foreign priority to GB Application No.: 1201994.9, filed Feb. 3, 2012, the disclosures of which are hereby incorporated by reference in their entireties.

FIELD OF THE INVENTION

The present invention concerns methods and systems for providing file data for a media file. More particularly, but not exclusively, the invention concerns the generation of a media file for a programme in such a way that essence data from the media file can be provided before the content of the entire programme has been finalised.

BACKGROUND OF THE INVENTION

Traditionally, digital media data has been distributed as a stream; for example, video data may be distributed using a serial digital interface (SDI) standard for streaming data. A characteristic of a stream of data is that it provides sequential access to the data that makes it up, and once a given piece of data has been provided by the stream, it cannot be requested again—the stream has no "memory". The use of a stream to transmit media data is particularly appropriate where the media data is of a live event, such as a sporting or news event, in which case the pieces of data making up the stream only become available to be transmitted as they occur in real time.

It is usual for the content of a programme such as a news programme to be dynamically determined as the programme is broadcast. A conventional system for producing a news programme is shown in FIG. 1. A user interface device 11 allows a user to control a running order 11a for the news programme. The running order 11a is a sequence of segments, which may include live footage provided by cameras 13a to 13b (for example of the news being read), and pre-recorded clips, advertisement breaks and so on provided by data stores 12a to 12c. The user interface 11 can be used to vary the running order as the programme is broadcast, for example by rearranging, omitted, or added to the segments that have not yet been broadcast as required to take account of events that occur (such as newly breaking news stories, problems with live footage and the like). The user interface 11 can also be used to directly manipulate the display of footage via a jog/shuttle dial, as used for example when showing slow motion replays of important parts of sports matches. The media data for the news programme is provided as a stream 14.

However, while media data has traditionally been distributed as a stream, it has become desirable to provide it as a file, for example as an MXF (Material eXchange Format) file, for reasons of cost and convenience (amongst other things). A characteristic of a file is that it allows random access; once a file is made available within a file system, a request may be made to the file system for any arbitrary piece of data from anywhere within the file.

One example of the use of a file to transmit media data is the transmission of a television programme over the Internet. This is now described with reference to FIG. 2. First, a file corresponding to a programme comprising segments $S_1$ to $S_n$ is provided. The file is then converted into a file comprising converted segments $S'_1$ to $S'_n$, which is a file of a form suitable for transmitting over the Internet. This may for example involve transcoding the file into a different format and/or quality. The conversion of the file is indicated by the bar C.

As noted above, the provision of the programme as a file means that random access to any piece of data within the file may be required. Consequently, the conversion process C expects all segments $S_1$ to $S_n$ of the file to be available within the file system prior to the conversion process beginning. Requiring the entire file to be available introduces a large time overhead for the availability of the converted file for transmitting over the Internet, as conversion can only begin once the entire unconverted file is available, which consequently means that the programme the file represents must have finished. This is a particular problem with programmes such as news programmes as described above, in which the running order for the programme can vary while the programme is being broadcast, meaning that the contents of the programme is not fixed until it is broadcast, and so it not possible to obtain the unconverted file ahead of time.

One partial solution to reducing the time overhead is to reduce the time taken by the conversion process C, by providing additional computing power. However, even if the unlimited computing power were available, with the result that the time for conversion was effectively reduced to zero, the necessity to wait until the programme had finished would still remain.

While random access to data from anywhere within a file is allowed, in order to avoid the delay associated with waiting for the writing of a file to complete, file systems will commonly allow data to be read from a file while its content is still being written to the file system, even though this means that the entire file is not yet available. This are however two problems with this. First, if a request is made for data from the file that has not yet been written to the file system, the file system will return false data, for example blank padding data or garbage data. Second, it is a characteristic of writing to a file in a file system that any part of the file can be written to. This means that while the writing is in progress, data previously read from the file may overwritten. As a result, with known file systems it is not safe to begin reading from a file before it has been completely written to the file system, as until that has occurred any data read from the file cannot be trusted to be correct.

Specialised file formats are known which are intended to be read from while still being written to. Such files consist of a series of segments each containing an index indicating where data can be found in that segment. Thus, if data is written to the file sequentially it can be read sequentially without later parts of the file needing to be referred to. However, the use of these requires that both the writing and the reading of the file occur in a well-behaved manner, which cannot be relied upon. Further, it would be advantageous to provide a solution that can be used with existing devices and the standard file formats they use.

Another solution is to modify the device that implements the conversion process so that it is able to accept streamed data rather than operating upon a file. However, again it would be advantageous to provide a solution that can be used with existing devices and the standard file formats they use.

The present invention seeks to mitigate the above-mentioned problems. Alternatively and/or additionally, the present invention seeks to provide an improved file system that provides file data for a media file in a way that does not require the contents of the entire file to be determined before any file data can be provided.

SUMMARY OF THE INVENTION

In accordance with a first aspect of the present invention there is provided a method of providing file data for a media file of a pre-determined format from a file system comprising a file record database and a data store, wherein the media file corresponds to a programme consisting of a plurality of segments, and wherein the segments included in the programme are dynamically determined, the method comprising the steps of:

receiving details of the programme including the duration of the programme;

determining the layout of the media file in the pre-determined format from the received details of the programme, the layout including locations for essence data within the file;

creating a file record in the file record database for the media file;

in response to a request for the location of essence data within the file, returning a location given by determined layout of the media file;

in response to an instruction that a segment is to be included in the programme, obtaining essence data corresponding to the contents of the segment;

in response to a request for a portion of essence data from the media file corresponding to a time period of the programme, returning essence data derived from the received essence data according to the determined layout of the media file.

The file system is able to use the duration of the programme to determine the layout of the media file, in particular the length of the media file and how the data it will contain will be arranged. This enables the file system to create a file record for the media file, and to provide details of the location that essence data will have within the file even though that essence data has not yet been received. (So for example, if the pre-determined file format has an index indicating the location of essence data within the file, the file system could create the index for the file in advance of the essence data being available.) Then, as instructions are received indicating what segments the programme is to contain, the file system is able to obtain the required essence data and create and return the corresponding file data making up the media file, even though essence data for later segments has not yet been obtained, as the later segments are not yet known.

Notably, as the file system determines the layout of the file, and then receives the essence for use creating the contents of the media file, the file system maintains control over the contents of the file. This is in contrast to a conventional file system in which the file would be written to the file system, and the file system would simply receive the data making up the file without having any control over (or knowledge of) the internal structure of the file or what the data it is receiving represents, the order in which the data is received, or whether any data is re-written.

Thus, it can be seen that the file system appears to present an ordinary file in response to any request, allowing it to be used with existing devices (such as transcoders). However, the file system is able to reliably return the contents of the media file when requested even if it does not yet have the essence data for generating subsequent contents. This is because the file is not being supplied via an ordinary file system write operation, i.e. from "outside" the file system, but rather the creation of the file from the essence data is done "inside" the file system using the stream of essence data, and is invisible to any device reading the file. In this way, in contrast to conventional file systems, the entire media file does not need to be available before the data it contains can begin to be read by another device.

Further, even though the content of the programme is dynamically determined, advantageously the media data for the programme does not need to be provided as a stream, so is simpler and cheaper. This also has the particular advantage that if the essence data for a segment is fully available, for example because the segment relates to a pre-recorded clip rather than live footage, the corresponding file data for the media file can be returned immediately and does need to wait to be streamed.

The instructions regarding the segments to be included in the programme may be provided by a user interface device. The user interface may allow a user to manipulate a running order for the programme. The user interface device should allow a user to make changes only to segments in the running order that have not yet been included in the programme, otherwise the running order will not match the contents of the programme as broadcast.

The instructions regarding the segments to be included in the programme may alternatively be provided automatically, for example by a software application. For example, the segments of a programme may be varied by changing or removing all the advertisements within the programme, without user input during the broadcast of the programme.

The programme may be of a live event, for example a sporting or news event. The programme may be only part of a complete broadcast event (for example only the first half of a football match), or may comprise multiple broadcast events and may include idents, advertisements and the like.

Preferably, the format of the media file requires that it comprise a plurality of segments of essence data located at pre-declared locations within the file, and wherein the determining of the layout of the media file comprises the steps of:

determining a maximum segment length for the file based on the required properties of the media file;

in response to a request for the location of a segment within the file, returning a location calculated by considering each segment of the media file to have the maximum segment length;

in response to a request for essence data from a segment of the media file, returning generated essence data for the segment, wherein the generated essence data comprises the essence data derived from the received essence data and padding data to give the generated essence data the maximum segment length.

This allows the layout of the media file with such a format to be determined before the essence data making up the file is available, and so before the byte length of essence data within each segment may be known, as each segment has a predetermined length which does not depend upon the essence data it will contain. Each segment may correspond to a section of media of a predetermined duration. The maximum segment length may be at least the maximum possible length of file data corresponding to a section of media of the pre-determined time duration. The maximum segment length may be calculated by assuming a minimum possible compression of the file data making up a segment.

Preferably, the format of the media file is MXF. However, the format may be any other suitable video format. While the invention is particularly advantageous when the format of the file is a compressed file format, for example MPEG-2 or MPEG-4 with intra-frame or GOP compression, fragmented MPEG-4, VC-1, Apple ProRes, etc., it is equally applicable when the format of the file is a non-compressed file format, for example Quicktime, uncompressed MPEG-4, AVI, WAV, etc.

Advantageously, the method further comprises the step of delaying the return of requested essence data to vary the speed with which essence data is provided by the file system. This can help avoid an excessive delay between a request for essence data from the media file being made and the essence data being returned, helping to avoid the possibility that the request will time out.

Preferably, the requests for data are made by a software application that requests essence data derived from the received essence data sequentially. A software application acting in such a manner enables the file system to return essence data as the corresponding essence data is received via the stream, preventing excessive delays in responding to requests.

Advantageously, the method further comprises the step of studying the behaviour of the software application to determine that it will request the essence data sequentially. This allows software applications that are suitable for use with the file system to be identified.

Advantageously, the instruction that a segment be included in the programme includes the duration of the segment, and the generated essence data for the segment is derived from the received essence data by omitting, duplicating and/or interpolating the frames of the received essence data. This means that, for example in the case that content of the segments are defined by a user using a jog/shuttle dial to manipulate the display of footage, the derived essence data can be generated efficiently form the obtained essence data. For example, if the manipulated footage contains multiple copies of the same frame, for example because a portion in repeated or played in slow motion (in which case each frame is repeated one or more times in order to achieve the slow motion effect), then the required frames of essence data only need to be obtained once, in contrast to a conventional system in which a stream of essence data in which the frames are repeated would be produced.

In accordance with a second aspect of the invention there is provided a file system for providing file data for a media file of a pre-determined format, wherein the file system comprises a file record database and a data store, the media file corresponds to a programme consisting of a plurality of segments, and the segments included in the programme are dynamically determined, wherein the file system is arranged to:

receive details of the programme including the duration of the programme;

determine the layout of the media file in the pre-determined format from the received details of the programme, the layout including locations for essence data within the file;

create a file record in the file record database for the media file;

in response to a request for the location of essence data within the file, return a location given by determined layout of the media file;

in response to an instruction that a segment is to be included in the programme, obtain essence data corresponding to the contents of the segment;

in response to a request for a portion of essence data from the media file corresponding to a time period of the programme, return essence data derived from the received essence data corresponding to the portion according to the determined layout of the media file.

Preferably, the format of the media file requires that it comprise a plurality of segments of file data located at pre-declared locations within the file, and wherein the file system is arranged, when determining of the layout of the media file, to:

determine a maximum segment length for the file based on the required properties of the media file;

in response to a request for the location of a segment within the file, return a location calculated by considering each segment of the media file to have the maximum segment length;

in response to a request for file data from a segment of the media file, return generated file data for the segment, wherein the generated file data comprises the file data derived from the received essence data and padding data to give the generated file data the maximum segment length.

Preferably, the format of the media file is MPEG-4.

Advantageously, the file system is further arranged to delay the return of earlier requested file data to vary the speed with which essence data is provided by the file system.

Advantageously, the instruction that a segment be included in the programme includes the duration of the segment, and the generated essence data for the segment is derived from the received essence data by omitting, duplicating and/or interpolating the frames of the received essence data In accordance with a third aspect of the invention there is provided a computer network comprising:

a file system as described above;

a computer device arranged to request the media file from the file system;

wherein the computer device is arranged to request essence data derived from the received essence data sequentially.

In accordance with a fourth aspect of the invention there is provided a computer program product arranged, when executed, to perform the steps of any of the methods described above.

In accordance with a fifth aspect of the invention there is provided a computer program product arranged, when executed on a computing device, to provide a file system as described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
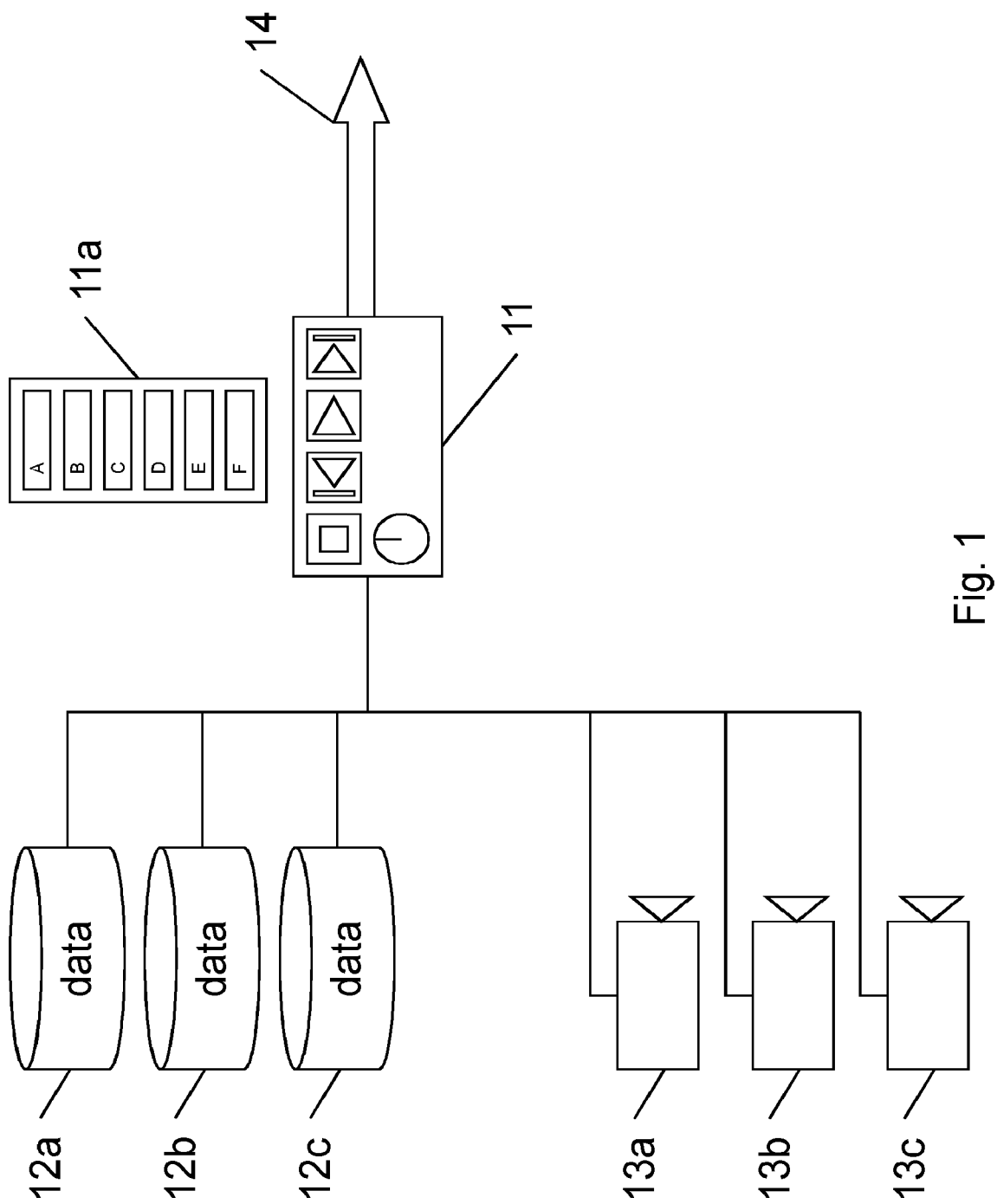
FIG. 1 is a conventional system for determining the content of a programme as it is broadcast.
Figure 2:
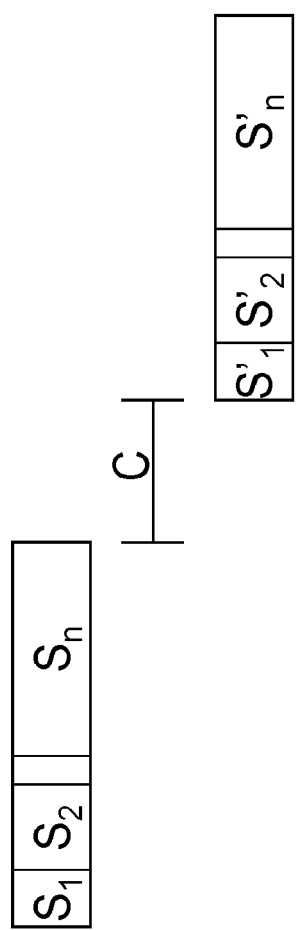
FIG. 2 is a diagram representing a conventional method of converting a media file for transmittal over the Internet.
Figure 3:
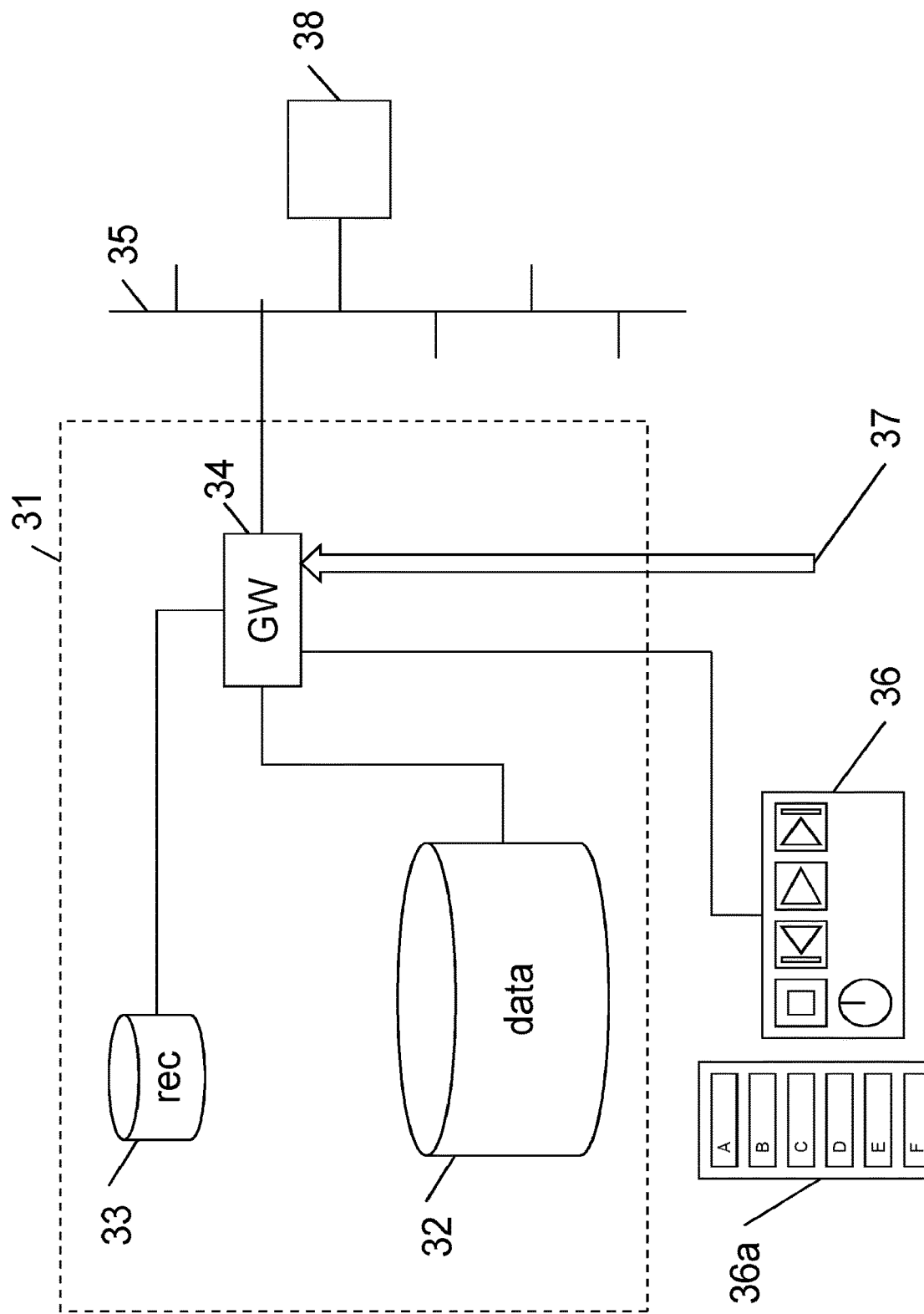
FIG. 3 is a system for determining the content of a programme as it is broadcast in accordance with a first embodiment of the invention, including a file system for generating a media file corresponding to the broadcast programme.

A first embodiment of the invention is now described with reference to FIG. 3. A file system 31 comprises a data store 32, a file record database 33, and a gateway 34. The gateway 34 is arranged to receive streamed essence data 37 (data constituting video and/or audio information). The file system 31 generates and allows to be read a media file for a programme such as a news programme, as described below. The gateway 34 is in communication with a user interface device 36 for controlling the running order 36a of the programme, in other words for determining the content of the programme while the programme is being broadcast.

The file system 31 is in communication via the gateway 34 with a network 35. A device 38 running a "qualified" software application, as described in detail later below, is in communication with the file system 31 via the network 35.

Figure 4:
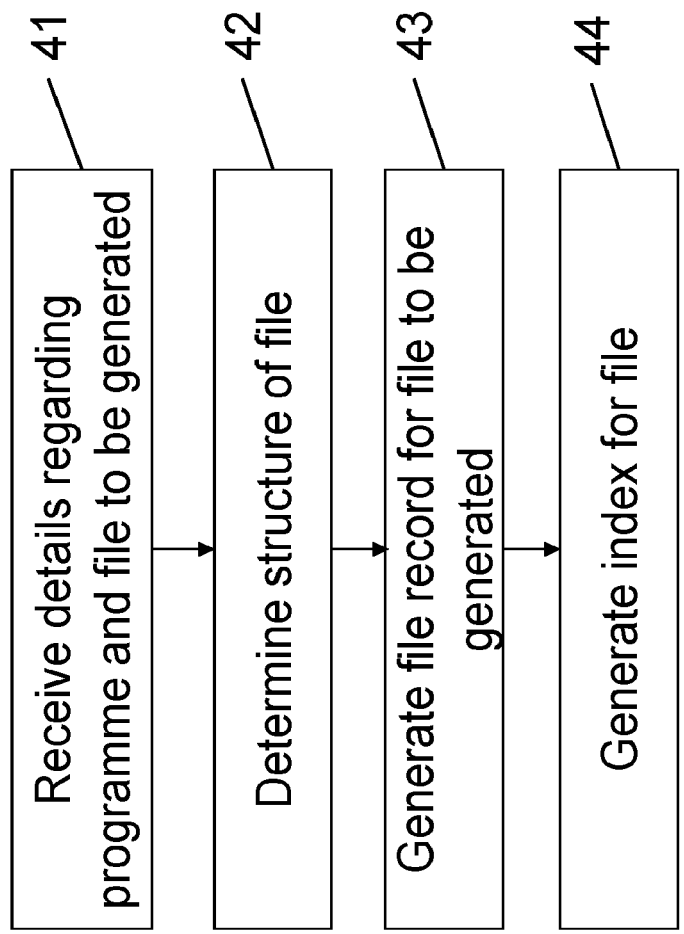
FIG. 4 is a flow chart showing the operation of the file system of FIG. 3 when beginning the generation of the media file.

FIG. 4 is a flow chart showing the operation of the file system 31 when beginning creation of the media file for the programme. Initially, before broadcast of the programme begins, the file system 31 will receive details regarding the programme and the file to be produced, including for example the length of the programme, and the quality and format of the file to be generated (step 41).

Figure 5:
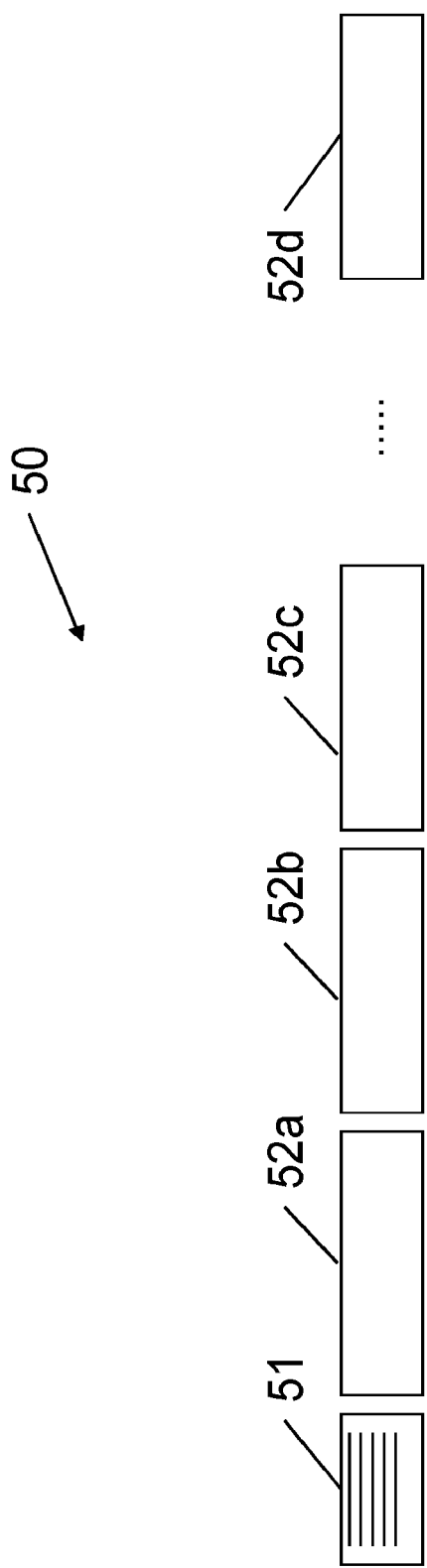
FIG. 5 shows the structure of the media file generated by the file system of FIG. 3.

The file system 31 then uses this information to determine the structure of the file to be generated (step 42). An example file structure is shown in FIG. 5. The file structure 50 is for an MXF file, and comprises an index 51, and a plurality of GOPs ("groups of pictures") 52a, 52b, 52c to 52d. A GOP is a series of images making up a particular sequence of video of a particular duration. The details received include the length of the programme, allowing the number of GOPs and the duration of video within them to be determined.

The images in a GOP are compressed, which would usually result in the GOPs being of different lengths (i.e. being made up of a different number of bytes). One reason for this is that the video a GOP represents will compress to a different size depending on the nature of the images making up the video; for example, as compression techniques include identifying the differences between images in a series, a series of very similar images will generally be compressed to a much smaller size than a series of images in which differ substantially from each other. This means that in general, the location of a GOP in a file will depend on the size of each preceding GOP, and the index 51 provides a mapping from time ranges of video to byte ranges in the file 40, thus allowing the GOP (or GOPs) corresponding to a particular time range of video to be found.

However, it can be seen from FIG. 5 that in the file structure 50 the GOPs 52a to 52d are all of the same size. This is achieved by having the file system 31 predetermine a size for each GOP. (It is important to note that the contents of the GOPs is not yet known, and so the exact size of the compressed essence data each GOP will contain cannot be determined.) The size of each GOP is determined by calculating the minimum possible compression, and so maximum possible byte range, of the images making up the GOPs. The actual size of each GOP in the structure is then taken to be at least this maximum possible size.

The file system 31 then generates a file record for the file and stores it in the file record database 33 (step 43). The file record will contain certain details about the file such, as its size, obtained from the structure of the file determined in the previous step. The index 51 for the file is then generated (step 44), again using the determined structure of the file and in particular using the predetermined sizes of the GOPs 52a to 52d.

File structures for other file formats may also be determined in an analogous manner, for example file in fragmented MPEG-4 format which comprise both an index at the beginning and a footer at the end for use in locating data within the file. Other file formats that may be used include compressed file formats such as MPEG-2 or MPEG-4 with intra-frame or GOP compression, VC-1, Apple ProRes, etc., and non-compressed file formats such Quicktime, uncompressed MPEG-4, AVI, WAV, etc.

Figure 6:
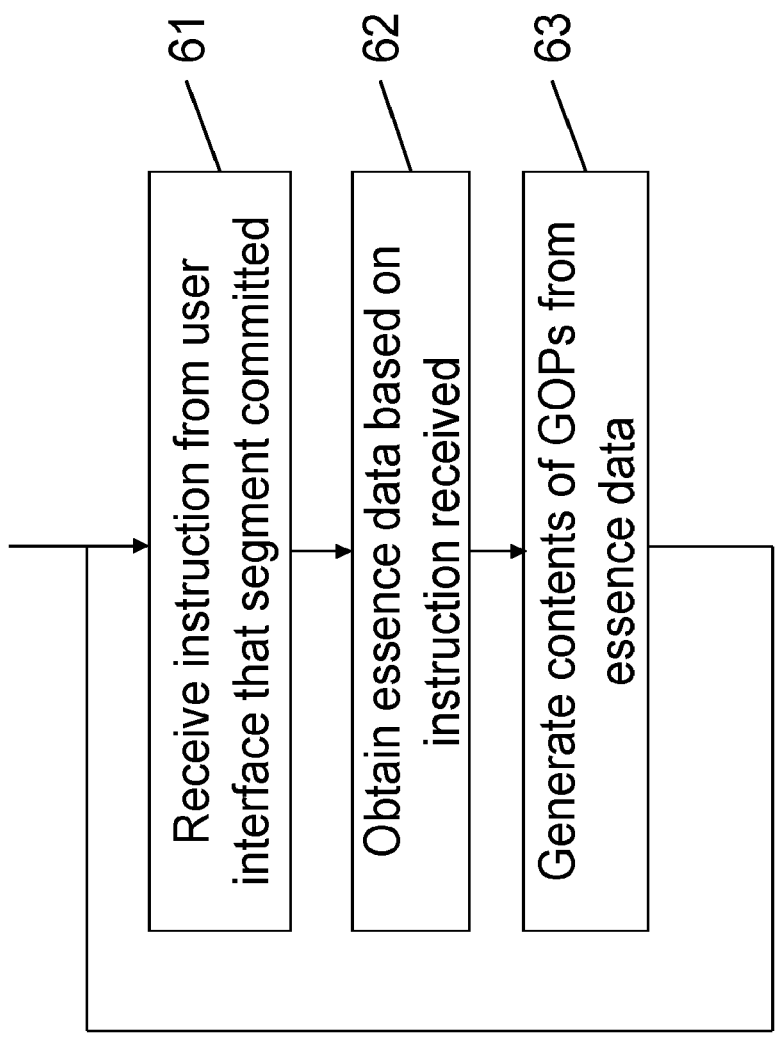
FIG. 6 is a flow chart showing the operation of the file system of FIG. 3 when generating the contents of the media file.

The creation of the file data making up the media file while the programme is being broadcast, i.e. the creation of the contents of the GOPs, is now described with reference to FIG. 6. The content of the programme is controlled by a user via the user interface device 61. Throughout the programme, the user will control which segment in the running order is to become part of the programme. For example, the user may instruct that the current segment should be live footage. Alternatively, the user may instruct that the current segment should be a pre-recorded piece of media.

In both cases, this results in an instruction from the user interface device 36 to the file system 31 that that particular segment has been committed to being in the programme (step 61). The user is of course free to change future items in the running order 36a, but it can be seen that it is not possible to change the current segment (other than to stop it at the point at which it has so far been broadcast so that the broadcast of another segment can begin) or to change any preceding segments, as they have already become part of the broadcast programme.

Once the file system 31 has received the instruction as to the segment that has been committed, it obtains the necessary essence data for that segment (step 62). In the case that the segment comprises live footage, the essence data will be obtained via the stream 37. In contrast, in the case that the segment is a pre-recorded piece of media, the required essence data will be obtained from wherever it is stored; the essence data may be stored in the data store 32, or can be obtained from remote storage via the network 35 for example. In the case that a jog/shuttle dial is used to manipulate the display of footage, the required frames of essence data are obtained. If the manipulated footage contains multiple copies of the same frame, for example because a portion in repeated or played in slow motion (in which case each frame is repeated one or more times in order to achieve the slow motion effect), then it can be seen that the frames of essence data in any case only need to be obtained once, in contrast to a conventional system in which a stream of essence data in which the frames are repeated would be produced.

The file system 31 then uses the essence data to generate the contents of the GOPs (step 63), with the data being compressed and distributed between the GOPs according to the predetermined structure of the file. As discussed above, the length of any GOP is determined to be at least the minimum possible compression of the images in a GOP. Of course, in practice the images will in the vast majority of cases compress to less than the minimum possible size, and in this case the free space within a GOP is filled with blank padding data.

The process is then repeated, as further segments are committed by the user until the entire programme has been broadcast (steps 61 to 63 repeated).

In the above embodiment the index of the file and the contents of the GOPs are generated as soon as it is possible to do so, in other words the index is generated when the details of the file and programme are received, and the GOP contents are generated as soon as the required essence data is obtained. However, in alternative advantageous embodiments the index and GOP contents are generated only when required, for example the index may be generated only when the file is actually requested, and the GOP contents may be generated only when requested. Any required essence data, for example that provided by the stream 37, may in the meantime be stored in the data store 32.

The operation of the file system 31 in response to a request for the file for the programme from the device 38 is now described. As noted above, the device 38 is running a "qualified" software application. A qualified software application is a software application that has been identified as accessing the data constituting a file in a particular predictable and well-behaved manner, as now described.

As discussed above, a characteristic of a file system is that it allows random access to a file, in other words any arbitrary data from the file can be requested. However, the inventor(s) have identified that certain software applications do not take advantage of the random access the file system provides, but rather access data from a file in a predictable manner. Any software application that is identified as reading the data from the file in a well-behaved manner that is suitable for the present invention is considered to be "qualified".

For the present invention, a software application is qualified if it only accesses data from the file that corresponds to essence data sequentially, meaning that the software application does not try to access data from the file corresponding to later essence data out of sequence. So, for example, a software application that transcoded a file (e.g. to convert it into a format and quality suitable for transmitting over the Internet) by initially accessing the index for the file, and subsequently reading the contents of the GOPs in order from the beginning to the end of the file, would be qualified. (It is noted that the index need not be located at the beginning of the file, and could be located at the end or there could be indexes at both the beginning and end, for example.) However, a software application need not be so well-behaved in order to be qualified; an application could read or re-read the index or any GOP already read at any time, or even read GOP data from the end of the file as long as that GOP data could be provided without requiring corresponding essence data for its generation. (So an application that was satisfied by being provided generic padding data from the end of a file could be qualified, for example.) It is important to note that what matters is not that the application reads the file data from the whole file in order, and in fact it is common for a file index to be located at the end of a file in which case it would be expected that the file data corresponding to that would be read first. What is required is that the application does not "jump ahead" by trying to read essence data stored later in the file out of turn.

It will be appreciated that transcoding is only one example of software application functionality that may result in a software application being qualified, and the invention equally applies to access by a qualified software application with any function.

In a similar fashion, any device, software service or the like may be identified as accessing a file in a well-behaved manner that allows it to be considered to be a qualified device, qualified software service, etc.

Figure 7:
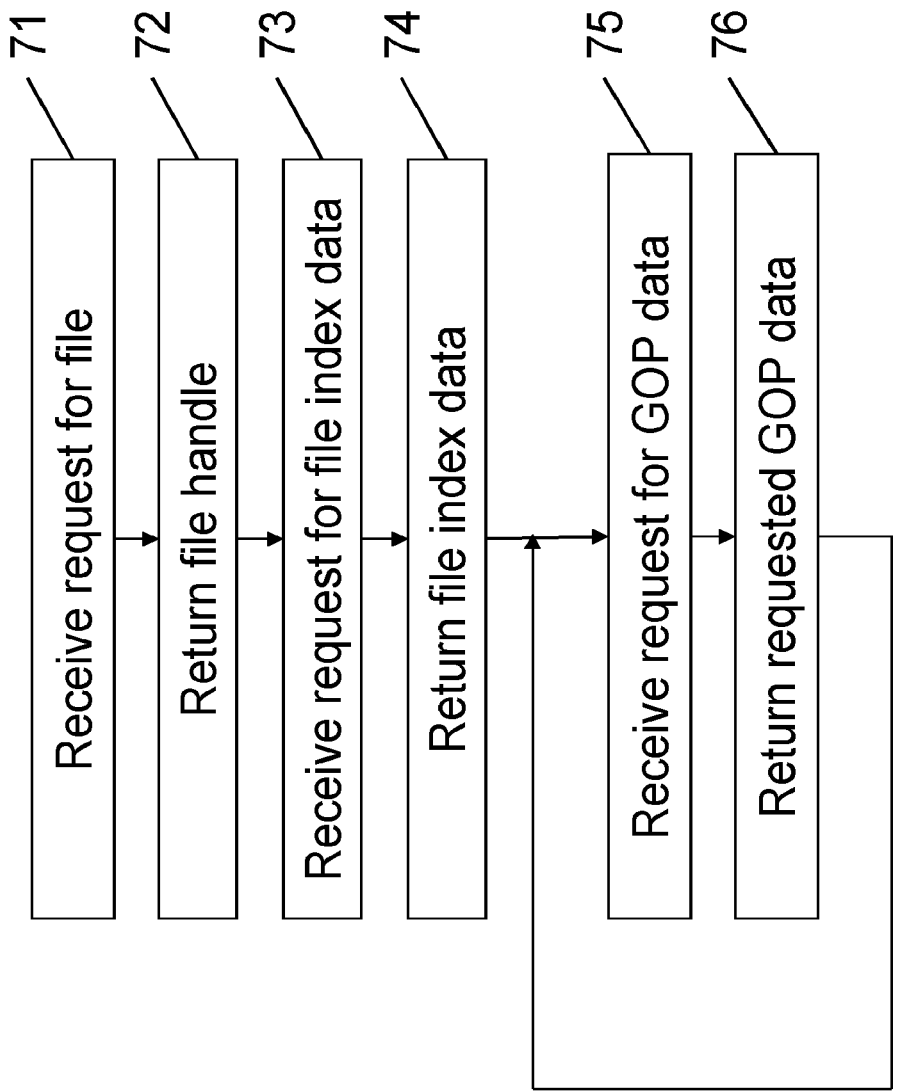
FIG. 7 is a flow chart showing the operation of the file system of FIG. 3 in response to a request for the media file.

The operation of the file system 31 in response to requests for data from the qualified software application 37 is now described with reference to FIG. 7. Initially, the file system 31 will receive a request to read a file (step 71). In response, the file system 31 returns a file handle linked to the file record for the file that was stored in the file record database 33 (step 72).

Next, as the software application running on the device 38 behaves in a well-behaved manner as described above, the file system 31 will receive a request for data from the file corresponding to the index of the file (step 73), which the file system 31 returns to the device 38 (step 74). It can be seen that this can be provided before any of the essence data for the file has been obtained. This is because the location of the GOPs within the file is predetermined by based on their maximum possible size, allowing the index to be generated before the essence data making up the GOPs is known. This is again unlike conventional systems in which the location of any GOP is dependent upon the compression possible for any preceding GOP, and so the index can only be generated once all GOPs have been generated, requiring all essence data to be available.

Next, the file system 31 will receive a request for data making up a GOP (step 75), which it returns (step 76). Again, because the software application running on the device 38 behaves in a well-behaved manner, the data requested will initially correspond to the first GOP in the file. This means that the data can be returned as soon as the essence data for that GOP only has been obtained, without the essence data for all GOPs needing to be available as in a conventional system.

The file system 31 will then receive requests for data from the subsequent GOPs in turn, and will return the relevant data (steps 75 and 76 repeated), with the file system 31 being able to return the data for a GOP as soon as the relevant essence data has been provided by the stream 31.

It will be appreciated that in the alternative embodiment in which the index and GOP data are only generated when requested, the operation of the file system 31 would be adapted accordingly.

Figure 8:
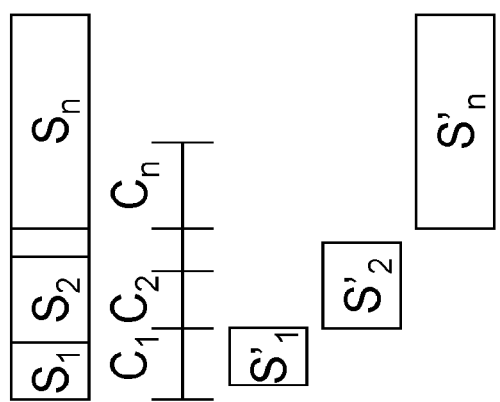
FIG. 8 is a diagram representing the method of converting a media file of the file system of FIG. 3.

FIG. 8 shows the effect of the invention when used to create a file that is then converted. Unlike with a conventional system, the conversion of the file can begin as soon as the essence data for the GOPs within the file becomes available, rather than the conversion having to wait until the entire file to be available. Suppose segment $S_1$ consists of live footage, the essence data for which is provided via the stream 37. The conversion of this segment, as indicated by the bar $C_1$, can begin almost immediately, and proceeds in "real time" as the essence data for segment becomes available. Consequently, the conversion of the segment finishes only a short time after the segment itself has finished.

Further, suppose segments $S_2$ and $S_n$ consist of pre-recorded footage. In this case, the conversion does not need to be performed in real time, as all essence data for the segment will already be available. Consequently, the conversion of the segments (as indicated by the bars $C_2$ and $C_n$) can be completed while the segments are still being broadcast (as there is no reason for the conversion to be performed in real time); or if conversion of a previous segment was still in process, the reduced time for converting the segment can allow the conversion process to "catch up".

It can be seen that the overall length of the conversion process $C_1$ to $C_n$ in this example in fact takes longer than the conversion process C in the conventional example. This is because the conversion can only occur as the contents of the file is made available, which may be only in real time if live footage is included, rather than in the conventional example in which the entirety of the file is available when the conversion begins. However, as the conversion begins while the file is still being created, the converted file is nevertheless available in full only shortly after the original file has been completed. The speed of the conversion is therefore not a disadvantage, and in fact is advantageous as it means that there is no reason to use a large amount of computing power, with the attendant expense, in order to reduce the time the conversion takes as much as possible.

It will be appreciated that if a pre-recorded segment is followed by a live footage segment, the essence data for the live footage segment may not be available when the conversion of the pre-recorded segment has completed. This may result in the device 38 making a request for a GOP substantially in advance of the file system 11 being able to provide it. This can result in a request for a GOP timing out, i.e. the data constituting the GOP is not returned within the maximum time allowed. To avoid this, the file system 31 can delay the return of earlier GOPs. This will in turn delay future requests made by the device 38, thus ensuring (or trying to ensure) that the required essence data is received within a sufficiently small time from the request being made, so that such timeouts do not occur.

Whilst the present invention has been described and illustrated with reference to particular embodiments, it will be appreciated by those of ordinary skill in the art that the invention lends itself to many different variations not specifically illustrated herein.

The invention claimed is:

1. A file system for providing file data for a media file having a predetermined format, the file system comprising:
    a data store storing essence data;
    a memory; and
    a processor configured to implement instructions on the memory so as to provide a media manager that:
        determines the predetermined format of the media file, which corresponds to a program comprising a plurality of segments;
        calculates a maximum segment length for the program based on the predetermined format of the media file;
        determines, prior to the essence data making up the media file being available, a layout of the media file in the predetermined format based on a time duration of the program and the maximum segment length, with the layout defining at least one location for the essence data within the media file;
        in response to a request for the at least one location of the essence data within the media file, returns a location for the essence data defined by the determined layout of the media file;
        in response to an instruction that a respective segment among the plurality of segments is to be included in the program, obtains the essence data from the data store that corresponds to contents of the respective segment; and
        returns the essence data based on the determined layout of the media file in response to a request for a portion of the essence data from the media file.

2. The file system according to claim 1, wherein the media manager determines the predetermined format of the media file based on an index that provides a mapping of time ranges for the plurality of segments for the program.

3. The file system according to claim 1, wherein the predetermined format of the media file defines the plurality of segments of the essence data located at pre-declared locations within the media file, and the media manager determines the layout of the media file based on calculated locations of each segment of the media file to have the maximum segment length.

4. The file system according to claim 1, wherein the media manager delays the return of the essence data to vary a speed at which the file system provides the essence data.

5. The file system according to claim 1, wherein the media manager receives an instruction that a segment is to be included in the program and obtains the essence data for the segment that is derived from the received essence data by omitting, duplicating and/or interpolating frames of the received essence data.

6. The file system according to claim 1, wherein the media manager determines the layout of the media file based on time offsets and byte offsets for frames of image data within the media file.

7. A file system for providing file data for a media file having a predetermined format, the file system comprising:
    a data store storing essence data;
    a memory; and
    a processor configured to implement instructions on the memory so as to provide a media manager that:
        determines the predetermined format of the media file for a program that includes a plurality of segments;
        determines, prior to the essence data making up the media file being available, a layout of the media file in the predetermined format based on a time duration of the program, with the layout defining at least one location for the essence data in the media file;
        in response to a request for the at least one location of the essence data, returns a location for the essence data defined by the determined layout of the media file;
        in response to an instruction that a respective segment among the plurality of segments is to be included in the program, obtains the essence data from the data store that corresponds to the respective segment; and
        in response to a request for a portion of the essence data from the media file, determines the essence data based on the determined layout of the media file.

8. The file system according to claim 7, wherein the media manager determines the predetermined format of the media file based on an index that provides a mapping of time ranges for the plurality of segments for the program.

9. The file system according to claim 7, wherein the processor is further configured to implement instructions to provide the media manager that:
    calculates a maximum segment length for the program based on the predetermined format of the media file,
    wherein the predetermined format of the media file defines the plurality of segments of the essence data located at pre-declared locations within the media file, and the media manager determines the layout of the media file based on calculated locations of each segment of the media file to have the maximum segment length.

10. The file system according to claim 7, wherein the media manager delays the return of the essence data to vary a speed at which the file system provides the essence data.

11. The file system according to claim 7, wherein the media manager receives an instruction that a segment is to be included in the program and obtains the essence data for the segment that is derived from the received essence data by omitting, duplicating and/or interpolating frames of the received essence data.

12. The file system according to claim 7, wherein the media manager determines the layout of the media file based on time offsets and byte offsets for frames of image data within the media file.

13. A system for providing file data for a media file having a predetermined format, the system comprising:
    a memory; and
    a processor configured to implement instructions on the memory so as to a file system that:
        determines, based on an index that provides a mapping of time ranges for a plurality of segments for a program, the predetermined format of the media file for the program that includes a plurality of segments;
        calculates a maximum segment length for the program based on the predetermined format of the media file;
        determines, prior to essence data making up the media file being available, a layout of the media file in the predetermined format and based on a time duration of the program and the calculated maximum segment length, with the layout defining at least one location for the essence data in the media file;
        in response to a request for the at least one location of the essence data, returns a location for the essence data to be included in the media file and that is defined by the determined layout of the media file;
        in response to an instruction that a respective segment is to be included in the plurality of segments for the program, obtains the essence data from a data store that corresponds to the respective segment; and
        in response to a request for a portion of the essence data from the media file, returns the essence data based on the determined layout of the media file.

14. The file system according to claim 13, wherein the predetermined format of the media file defines the plurality of segments of the essence data located at pre-declared locations within the media file, and the processor determines the layout of the media file based on calculated locations of each segment of the media file to have the maximum segment length.

15. The file system according to claim 13, wherein the processor delays the return of the essence data to vary a speed at which the file system provides the essence data.

16. The file system according to claim 13, wherein the processor receives an instruction that a segment is to be included in the program and obtains is configured to obtain the essence data for the segment that is derived from the received essence data by omitting, duplicating and/or interpolating frames of the received essence data.

17. The file system according to claim 13, wherein the processor determines the layout of the media file based on time offsets and byte offsets for frames of image data within the media file.

* * * * *